Inventor
A. R. Kirkpatrick 3,074,872
Patented Jan. 22, 1963

3,074,872
NUCLEAR REACTORS
Alan Robert Kirkpatrick, Newcastle-upon-Tyne, England, assignor to C. A. Parsons & Company Limited, Newcastle-upon-Tyne, England
Filed Dec. 4, 1957, Ser. No. 700,614
Claims priority, application Great Britain Dec. 4, 1956
2 Claims. (Cl. 204—193.2)

This invention relates to nuclear reactors of the kind comprising a shell formed by a radiation shield and a vessel, said vessel housing a core of neutron moderating material in the form of graphite, said core having channels disposed therein, some of which house nuclear fuel in the form of natural uranium or low enrichment uranium, whilst others or the remainder house means movable within the core to control the neutron flux, the nuclear fuel being inserted in to and removed from the core through charging tubes located in ducts which penetrate the reactor vessel.

In such reactors it is usual to construct each charging tube in two parts, a fixed part that is to say a part the axis of which is fixed in space although said part may be rotatable about its axis, and a movable part the axis of which is displaceable relative to the axis of the fixed part. The fixed part of the tube passes through the aforesaid duct in the reactor shell to the outside of the reactor structure to a charging platform from which the tubes are charged with nuclear fuel. The fixed part of each tube is axially aligned with a channel in the reactor core for nuclear fuel whilst an arm or the movable part is movable a defined distance away from the axis of the fixed part so as to be capable of being axially aligned with other channels within a defined radius for the purpose of charging these channels with nuclear fuel.

The control means usually consist of control rods which are moved within the core by means of motivating mechanisms located in ducts penetrating the reactor shell. In known constructions of the type of reactor described, the control rod ducts have been used as the duct through which the charge tubes are introduced. An arrangement of this type is shown, for example, in the article in Nucleonics, for November 1956, page 138 and following, and also in J. Brit. Nucl. Energy Conf., for April 1957, in the articles commencing at pages 146 and 187.

The manipulation of the control rods and the fuel charging tubes are all controlled from the same platform and various arrangements of duct spacing and channel pitch are possible.

In the choice of any system, however, consideration must be given to the following factors which influence a particular selection:

(1) It is desirable for operational reasons to have separate ducts for charge tubes and control rods so as to be able to operate the charge tubes independently of the control rods;

(2) A sufficiently large ratio of control rods to fuel elements should be possible so as to control the required amount of reactivity in the reactor;

(3) The pitching of the charge tube ducts and control rod tubes should be of sufficient magnitude to avoid mechanical weakening of the reactor shell or wall of the reactor vessel through which they pass;

(4) The arrangement and pitching of the ducts should be such as to allow for the placing of sufficient concrete for the radiation-shield and reinforcement therefor to give the shield adequate mechanical strength;

(5) The movable part of each charging tube should have a simple scanning pattern and be movable in such a way that as many fuel channels as possible are covered.

The object of the present invention is to provide an arrangement in which there are separate ducts penetrating the shell for charge tubes and control rods and in which the above requirements are substantially met.

The invention utilizes a nuclear reactor comprising a vessel, a core of neutron moderating material, in the form of graphite, within said vessel, channels disposed within said core, a proportion of which are used for housing nuclear fuel in the form of natural or near natural or low enrichment uranium whilst others or the remainder house control means for varying the neutron flux within said core, charging and discharge means for inserting said fuel into and removing said fuel from the core respectively, which charging and discharge means comprise a series of tubes, each tube having a fixed portion penetrating the reactor shell and axially aligned with a channel for nuclear fuel and a movable portion capable of being moved in any or substantially any direction away from the axis of the fixed portion to a position in axial alignment with other channels, in which reactor the channels are arranged in a series of parallel equidistant rows in two mutually perpendicular directions the pitch of the channels being the same in each direction and the fixed tube portions of the charging and discharging means being located with their axes forming the apices of isosceles triangles of base 6 times the pitch and side $\sqrt{45}$ times the pitch of the said channels, the movable part of each charging and discharge tube being capable of moving a distance in a plane at right angles to axes of the channels equal to $\sqrt{10}$ times the pitch of the channels, those channels located outside the sweep of the movable tube being used to house means for controlling the neutron flux.

The invention also contemplates an installation in which the control means comprise control rods which are movable in and out of the core by means of motivating means operating through a series of ducts penetrating the shell and in axial alignment with said control rod channels.

The invention also consists in a nuclear reactor substantially as described below with reference to the accompanying diagrammatic drawings, in which.

Figure 1:
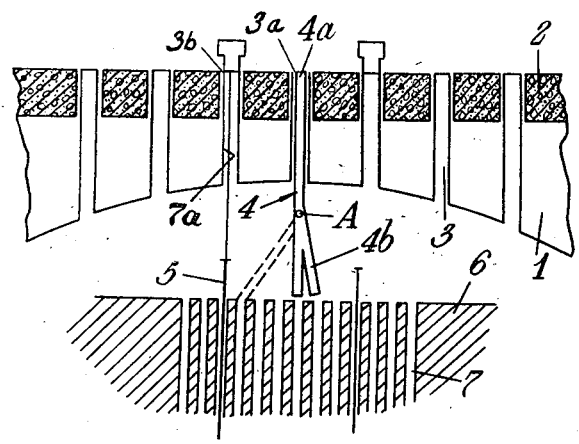
FIGURE 1 shows a section through part of a reactor structure.

In carrying the invention into effect in the form illustrated by way of example and referring first of all to FIGURE 1, the reactor comprises a vessel 1 which may be pressure tight. Surrounding the vessel is a concrete radiation shield 2. Passing through the concrete shield 2 and vessel 1 are a plurality of ducts in the form of stand pipes 3 some of which, such as 3a, house charge tubes 4 for the insertion into the reactor and removal therefrom of nuclear fuel, whilst the remainder, such as 3b, house tubes for the passage therethrough of control rods 5 which control the neutron flux in the reactor. The reactor has a core 6 of graphite which core contains a plurality of channels 7 and 7a of circular cross section for the nuclear fuel and for the control rods respectively.

Each charge tube 4 comprises a fixed part 4a and a movable part 4b. The part 4a has its axis fixed as described above but can be rotated about its axis. The movable part 4b can for example be free to move about a fixed point A on rotation of the part 4a so as to bring the lower end into alignment with one of the channels 7 in the core.

Figure 2:
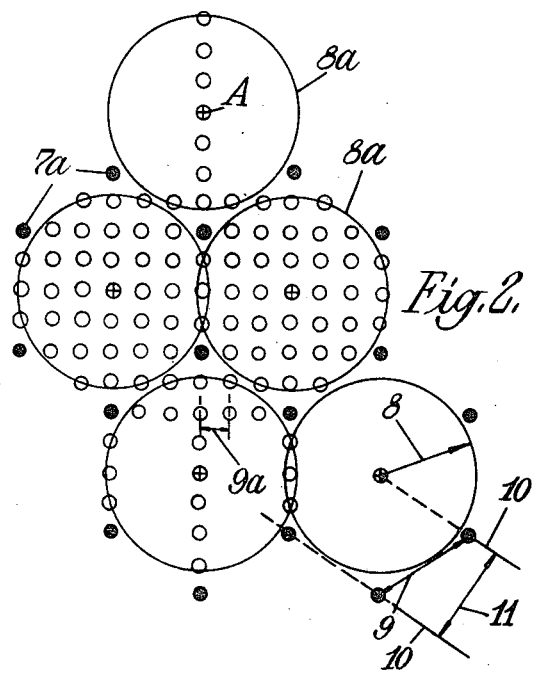
FIGURE 2 shows a plan view of the surface of a reactor core in accordance with one form of the invention.

Referring now to FIGURE 2 the channels 7 are disposed, in accordance with the invention in parallel equidistant rows in two mutually perpendicular directions, the channel pitch being the same in each direction. The standpipes 3a and the fixed portions of the charge tubes are disposed so that they are axially aligned with channels the axis of which form the apices of isosceles triangles of base 6 times the pitch of the channels and side $\sqrt{45}$ times the pitch of the channels. The movable part 4b of each charge tube is disposed to move in any direction over the face of the core about the axis of the fixed part of the tube and the end of the part 4b moves a maximum distance, marked 8, of $\sqrt{10}$ times the pitch of the channels. Circles 8a made on the drawing show the maximum radial sweep of the parts 4b. The channels 7a outside the sweep are shown in black and these channels are used to house the control rods.

Each movable tube 4b is thus capable of charging 37 channels six of which are shared with adjacent tubes and the ratio of control rod channels to fuel channels is 1 to 17.

The resultant stand pipe arrangement has a pitch, marked 9, of $p\sqrt{13}$ where $p$ is the pitch, marked 9a, of the channels and there are parallels 10 of $p\sqrt{11}$ separation, marked 11, which provides clear paths for the laying of concrete for the concrete shield and of reinforcement therefor.

As the control rod channels 7a are outside the sweep of the charge tube they can operate independently of the fuel channels.

I claim:

1. In a reactor of the kind comprising a shell formed by a radiation shield surrounding a vessel, a core of neutron moderating material within the vessel, channels disposed within said core, a proportion of which are used for housing nuclear fuel whilst others house control means for varying the neutron flux, ducts penetrating the said shell and in axial alignment with the channels housing the control means through which ducts said control means may be inserted in or removed from the reactor and charging tubes for inserting said fuel into or removing it from the reactor, said tubes comprising a fixed portion for alignment with a fuel channel and a movable portion capable of being moved in any direction away from the axis of the fixed portion to positions where at least an end portion is in alignment with another fuel channel; the disposition of the channels in a series of parallel equidistant rows in two mutually perpendicular directions, the ptich ($p$) of the channels being the same in each direction and the provision of further ducts, penetrating the shell, each of which is aligned with a fuel channel and through which a charge tube may be introduced, the arrangement being that the said further ducts are located with their axes forming the apices of isosceles triangles of base $6p$ and side $\sqrt{45}p$, the movable portion of said charge tube being capable of movement in a plane at right angles to the axes of the channels so that at least its end portion moves a distance $\sqrt{10}p$, and that the channels outside the sweep of a movable tube are used to house the means for controlling the neutron flux.

2. A nuclear reactor as claimed in claim 1, in which the control means comprise control rods which are movable in and out of the core.

References Cited in the file of this patent
UNITED STATES PATENTS 2,782,158     Wheeler _____ Feb. 19, 1957
2,863,815     Moore et al. _____ Dec. 9, 1958

OTHER REFERENCES

Progress in Nuclear Energy Series II Reactors, R. A. Charpie et al., McGraw-Hill Book Co., New York, 1956, pages 130, 392, 393, 399.

November 1956, Nucleonics, pp. 138–144.